July 12, 1966  R. K. SHELBY  3,260,336
CUP STACKING APPARATUS
Filed Aug. 26, 1964  3 Sheets-Sheet 1
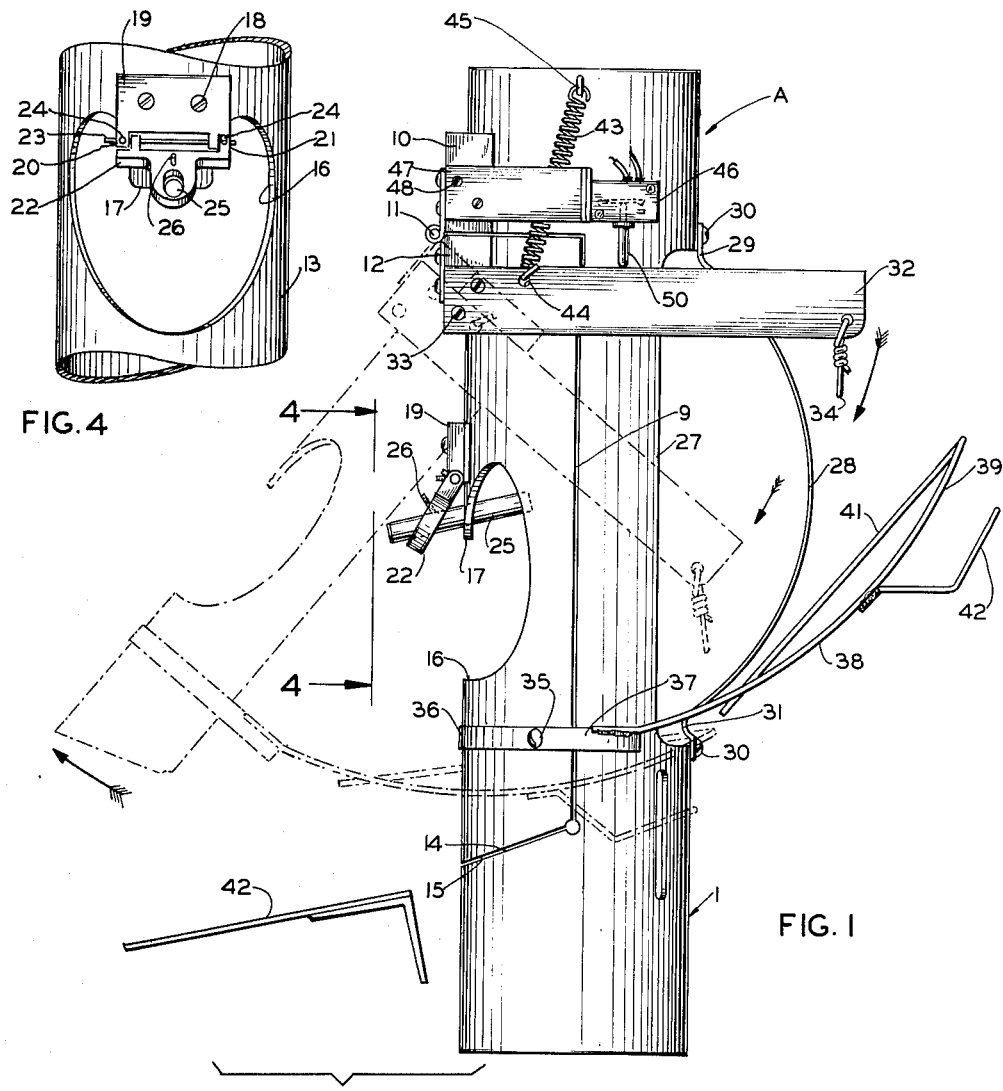
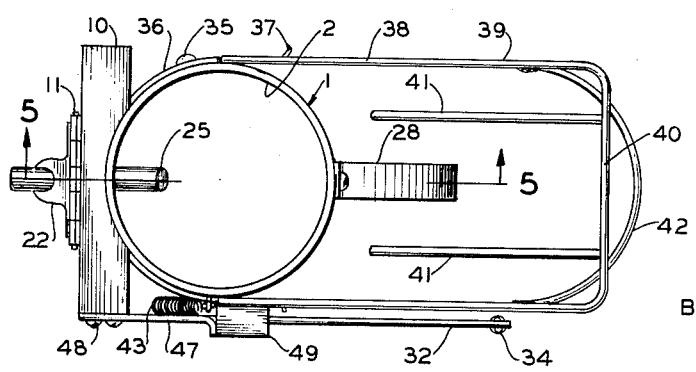
INVENTOR
RICHARD K. SHELBY
BY Robert J. Schaap
ATTORNEY July 12, 1966   R. K. SHELBY   3,260,336
CUP STACKING APPARATUS Filed Aug. 26, 1964   3 Sheets-Sheet 2

INVENTOR
RICHARD K. SHELBY
BY *Robert J. Schaap*
ATTORNEY

July 12, 1966   R. K. SHELBY   3,260,336
CUP STACKING APPARATUS
Filed Aug. 26, 1964   3 Sheets-Sheet 3
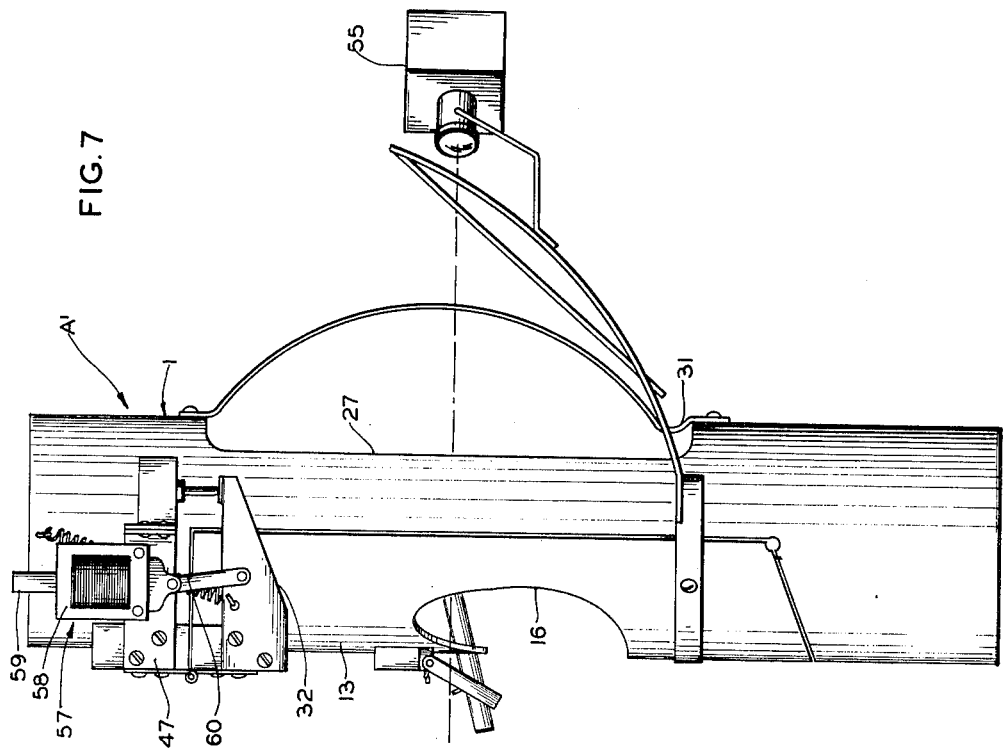
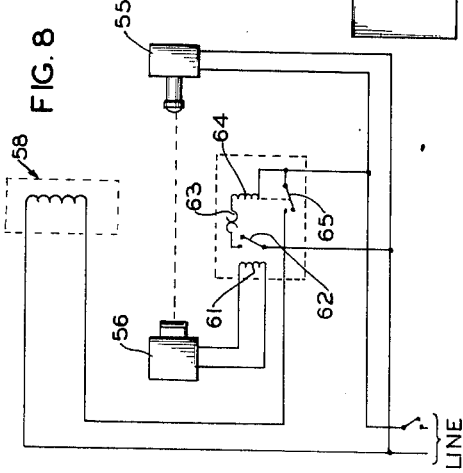
INVENTOR
RICHARD K. SHELBY
BY Robert J. Schaap
ATTORNEY United States Patent Office 3,260,336
Patented July 12, 1966

3,260,336
CUP STACKING APPARATUS
Richard K. Shelby, Downers Grove, Ill., assignor to Monsanto Company, St. Louis, Mo., a corporation of Delaware
Filed Aug. 26, 1964, Ser. No. 392,185
12 Claims. (Cl. 193—43)

This invention relates in general to certain new and useful improvements in cup stacking apparatus and more particularly to a device for reversing the direction of a series of continuously fed direction oriented containers.

Thermoplastic materials, such as polyethylene, polystyrene, modified polystyrene and polybutadiene have found widespread use in the manufacture of thin-walled containers such as disposable cups and similar molded products, inasmuch as materials of this type are capable of being readily thermo-formed. Due to the relative inexpensiveness of the molding material and the ease of manufacture, there have been a large number of devices such as the device described in United States Letters Patent No. 2,967,328 to R. K. Shelby et al. for manufacturing large numbers of thin-walled disposable containers in a mass production operation.

After these containers have been molded, they are usually fed on continuous webs to cutting devices which sever the container from the web and thence to stacking devices which are capable of stacking the containers so that they may be ultimately cartoned and shipped. These containers are usually formed by passing the sheet of thermoplastic material between a pair of cooperating male and female dies for molding the sheet to a desired shape. Prior to the molding thereof, the sheet of thermoplastic material must be heated to a temperature which approaches its melting point temperature, but which is not yet sufficient to reorient the plastic material. At the desired temperature, the sheet of material is fairly pliable and relatively flexible and capable of being easily formed. However, for some time after the molding operation, the finally molded article is capable of being marred through even moderate contact with a hard surface or when subjected to a similar type of stress.

In the prior art, it has been a common practice to stack these molded articles after they have been emitted from the molding machine and severed from the web. Often times, the molded articles such as the containers are reversed in their direction prior to the stacking operation. Usually the containers would strike some type of an abutment in the stacking operation for reversal of direction. This striking of the abutment usually caused a slight marring and deformation of the portion of the container which made contact with the abutment and, therefore, ruined the commercial value of the molded article.

The cup stacking apparatus of the prior art were also ineffective in that they did not provide any adequate means for clearing a lodged container. The containers are usually fed to the stacking apparatus in a continuous operation as they are emitted from the molding machine and the cutting device; and as they are emitted, they pass through the stacking apparatus. If one container should become jammed or lodged in the passageway of the device for orienting the direction, the device would be rendered completely useless until the container was cleared. This would not only require the immediate attention of the necessary personnel but would cause an overload of cups in the stacking device.

It is, therefore, the primary object of the present invention to provide an apparatus for stacking and orienting the direction of thin-walled containers.

It is another object of the present invention to provide an apparatus of the type stated which is capable of orienting the direction of a series of continuously fed thin-walled containers in a mass-production operation.

It is a further object of the present invention to provide an apparatus of the type stated which is provided with a clearing mechanism for immediate removal of any container which becomes lodged therein during the direction reversing operation.

It is also an object of the present invention to provide an apparatus of the type stated which is rigid in its construction, requires a minimum amount of maintenance and is relatively inexpensive to manufacture and operate.

With the above and other objects in view, my invention resides in the novel features of form, construction, arrangement and combination of parts presently described and pointed out.

In the accompanying drawings (3 sheets):

FIGURE 1 is a side elevational view, partially broken away and in section, of a cup stacking apparatus constructed in accordance with and embodying the present invention;

FIGURE 2 is a top plan view of the cup stacking apparatus of FIGURE 1;

FIGURE 4 is a fragmentary sectional view taken along line 4—4 of FIGURE 1;

FIGURE 7 is a side elevational view of a modified form of the cup stacking apparatus constructed in accordance with and embodying the present invention; and FIGURE 8 is a schematic view of the electrical circuitry forming part of the automatic clearing mechanism in the cup stacking apparatus of FIGURE 7.

Figure 3:
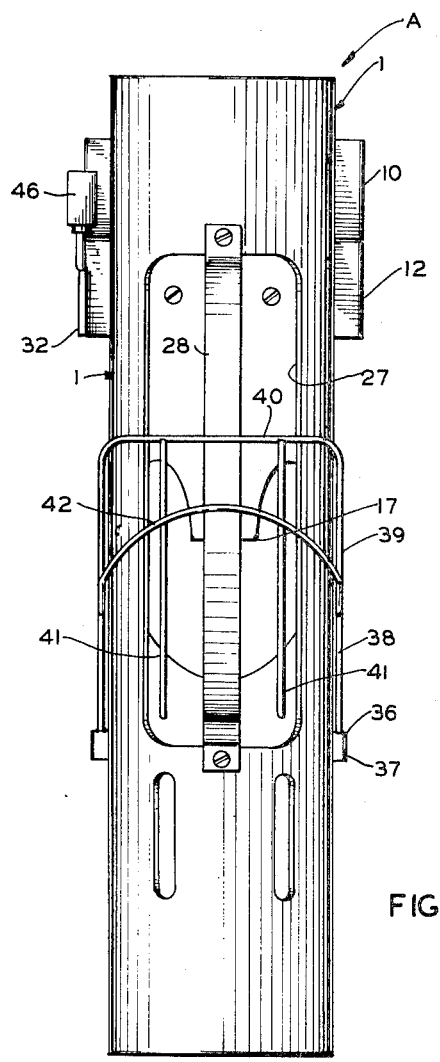
FIGURE 3 is a front elevational view of the cup stacking apparatus of FIGURE 1.

Generally speaking, the present invention comprises a tubular direction reversing housing which is cylindrical in horizontal cross section and is sized to accommodate the containers which are to be direction reversed. A feeding tube is connected to the upper end of the housing and is adapted to feed a series of nestable cups through a central passageway in the housing with the cups having their open ends directed downwardly. At its lower end, the housing is also provided with a tube for withdrawing the containers which have been reversed in their direction.

The housing is cut away in the provision of a clearing aperture and hingedly mounted on the housing and disposed over the clearing apertures in closurewise position is an arcuately shaped closure plate. The housing is provided with an elongated aperture as a relief for the closed end of the container and the swingout plate is provided with a diametrically opposed aperture providing a relief for the open end of the container as the container rotates through a 180° arc, thereby providing sufficient area for the direction reversing operation. Furthermore, a series of arcuately shaped retaining bands are disposed over the elongated aperture formed within the housing for retaining the container as it rotates through the arc. A pivot pin is secured to a flange which extends into the aperture formed in the closure plate and is adapted to engage the peripheral margin of the open end of the container as it passes through the housing. The engagement of the container at a point which is offset from its central vertical axis will cause the container to pivot about a horizontal axis and thereby reverse its direction. The pivot pin is mounted on a torsion bar type element so that it has a degree of resiliency and will move for a predetermined distance with the container as the container passes downwardly through the housing in its direction reversing operation.

A manually operable means is provided for opening the closure plate when a container has become lodged within the passageway of the housing. Also secured to the closure plate are a plurality of guide fingers which extend through the elongated aperture formed within the housing and guide the movement of the container outwardly through the clearing aperture. A second modification is also provided where a light sensitive transducer and a source of light are designed to sense the presence of the lodged cup in the passageway of the housing. The light sensitive transducer would, of course, sense the presence of each container as it passes through the housing and is connected to a time delay relay coil which will actuate a solenoid and shift an actuating element to open the closure plate if a container remains in the housing longer than a predetermined time interval.

Referring now in more detail and by reference characters to the drawings which illustrate practical embodiments of the present invention, A designates a cup stacking device comprising an open ended housing 1 which is preferably formed of aluminum or other lightweight metal. The housing 1 is circular in horizontal cross section with a diameter of approximately 3½" and is sized to accommodate thin-walled cups $c$ of the type described in U.S. Letters Patent No. 2,967,328 issued to R. K. Shelby et al. The cups $c$ are of the disposable drinking type and each having a trunkated cone shape and in final form ending in a rolled marginal lip along the open end.

The housing 1 is provided with an upper open end 2 and a lower open end 3 and secured to the upper end 2 through a metal band type fastener 4 is a feeding tube 5. The feeding tube 5 is connected to some suitable mechanism (not shown) for continuously feeding a plurality of cups $c$ to the housing 1 and all of which are oriented in the direction where their open ends are pointed downwardly. The cups $c$ are normally passed through an elongated central passageway $b$ formed within the housing and discharged, after the direction reversing operation, which is to be hereinafter described, through the lower end 3. Connected to the lower end 3 for collecting the direction reversed cups is a stacking bin 7 which is conventional in its construction and is, therefore, neither illustrated nor described in detail herein. The stacking bin 7 is connected to the lower end 3 through any suitable fastener such as a band type fastener 8.

Figure 5:
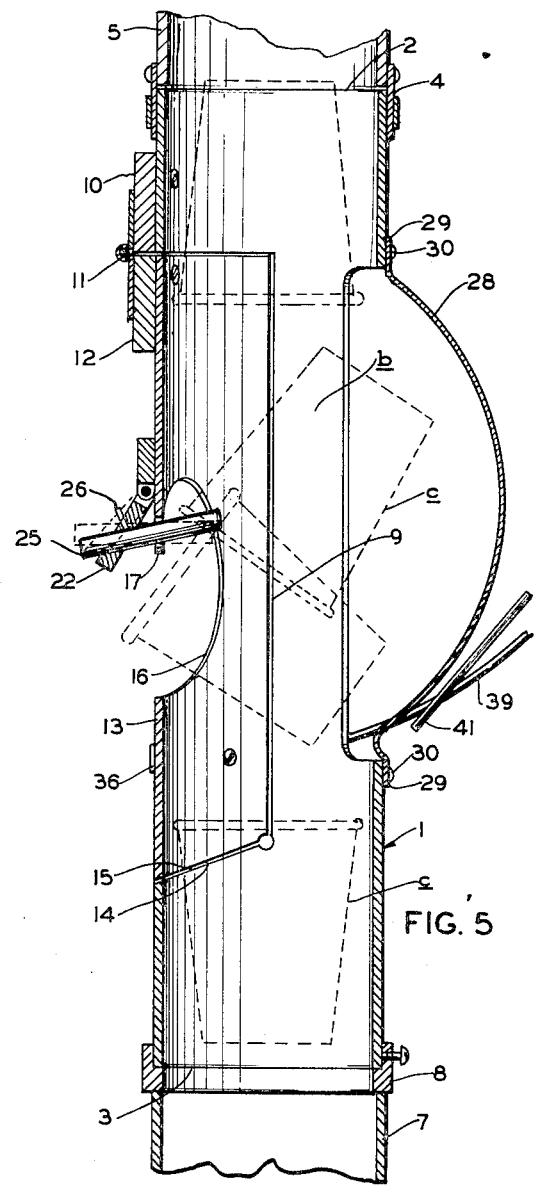
FIGURE 5 is a vertical fragmentary view taken along line 5—5 of FIGURE 2.

The side wall of the housing 1 is formed with an elongated clearing aperture 9 having a length of approximately 9 inches and which extends for approximately ½ inch of the annular distance of the side wall of the housing 1, substantially as shown in FIGURE 1. Welded to the upper end of the housing 1 along the rearward surface thereof, reference being made to FIGURE 5, is a hinge block 10 and secured to the lower end of the hinge block 10 through a hinge pin 11 is a hinge block 12, the hinge block 12 being spot welded or otherwise rigidly secured to an arcuately shaped swing-out closure plate 13. The plate 13 is disposed over the aperture 9 in closurewise position and is sized to assume the contour and shape of the housing substantially as shown in FIGURE 5. Thus, the closure plate 13 extends for approximately ½ inch of the annular side wall distance of the housing 1 and has a length of approximately 9 inches. The lower edge of the aperture 9 and of the matching closure plate 13 are formed with matching inclined edges 14, 15 also substantially as shown in FIGURE 5.

The closure plate 13 is provided somewhat centrally of its length with a direction reversing aperture 16, substantially as shown in FIGURES 1 and 4. The aperture 16 has a length of approximately 3⅛ inches and extends for a depth of ¾ inch from the rearwardmost margin of the closure plate 13, reference being made to FIGURE 1. Integrally formed with the closure plate 13 along the periphery of the aperture 16 and extending downwardly thereinto is a flange 17, the vertical margins of which are spaced from the opposed vertical margins forming the aperture 16 by a distance of 1¼ inches. Moreover, the flange 17 extends downwardly for an approximate distance of 1¼ inches and renders somewhat of a heart shaped appearance to the aperture 16, substantially as shown in FIGURES 1 and 4.

Rigidly secured to the rearwardly presented surface of the closure plate 13 in approximate vertical alignment with the flange 17, by means of sheet metal screws 18, is a retaining block 19. The retaining block 19 is integrally formed with a pair of depending leafs 20 which are spaced to cooperate with and lie in marginal registration with a pair of upstanding leafs 21 integrally formed with a pivot block 22, the latter being pivotally mounted on the retaining block 19 through a pivot pin 23. The pivot pin 23 serves the function of a torsion bar and is somewhat rigid with regard to radial rotation through a pair of set screws 24 which extend through the leafs 20 in the manner as shown in FIGURES 1 and 4. The pivot block 22 is normally maintained at an angle of about 20° with respect to the axial center line of the housing 1 but the normal position thereof can be varied by adjusting the set screws 24. Adjustably secured to the pivot block 22 is a direction reversing pivot pin 25 which extends through an aperture formed within the flange 17 and extends into the housing 1 for a distance of approximately ⅝ inch. The pivot pin 25 is retained within the pivot block 22 through a set screw 26, thereby affording a mechanism for adjusting the distance that the pin 25 extends into the housing 1. Through means of the above outlined construction, it is therefore possible to adjust the distance that the pivot pin extends into the housing 1 as well as the angle in which the pivot pin extends into the housing. For the purpose of reversing the direction of the cups $c$, hereinabove described, it has been found that the minimum angle to be maintained with respect to the horizontal is 10° and the maximum angle is 35°. However, the best results have been obtained when the angle of the pivot pin 25 has been maintained at approximately 15° with respect to the horizontal.

The housing 1 is further provided along its forward face, reference being made to FIGURE 1, with a direction reversing aperture 27 which is disposed in horizontal alignment with and cooperates with the direction reversing aperture 16. The aperture 27 is formed with a length of approximately 7½ inches and extends inwardly into the housing 1 for a depth of approximately ¾ inch. Secured to the exterior face of the housing 1 in alignment with the direction reversing aperture 27 is an arcuate guide band 28 which extends over the aperture 27 and is provided with upper and lower flanges 29 for securement to the exterior surface of the housing 1 through sheet metal screws 30. The guide band 28 is formed with an inwardly curved arcuate lip 31 along its lower end, for reasons which will presently more fully appear.

Thus, when a plurality of cups $c$ are fed to the housing 1, through the feeding tube 5, and which are oriented in the direction where their open ends are pointed downwardly, the cups $c$ will pass through the elongated central passageway $b$ formed within the housing 1. The lip of the cup $c$ is then designed to engage the direction reversing pin 25 where the sealed lower end of the cup $c$ will swing through the aperture 27 in an arc of approximately 180°. The cup $c$ is maintained in its direction reversing action through the guide band 28. As the lower sealed end of the cup $c$ extends through the aperture 27, the lip of the cup $c$ will find relief in the aperture 16 as it is reversed. Moreover, the cup $c$ will not become lodged between the lower end of the band 28 and the pin 25 due to the arcuate lip 31 which guides the direction reversed cup $c$ into the passageway $b$ for ultimate discharge from the housing 1. As the pin 25 is resiliently mounted, it will swing downwardly somewhat with the cup $c$ and thereby prevent any sudden jar and any resultant deformation of the lip of the cup $c$.

In the event that a cup $c$ becomes lodged within the housing 1, it is possible to open the closure plate 13 through a handle 32 which is secured to the lower hinge block 12 through screws 33. Secured to the free end of the handle 32 is a wire or similar type of flexible cord 34, the lower end of which is located in close proximity to an individual responsible for removing a stack of oriented nested cups c from the stacking apparatus A. Thus if this individual should notice a lodged cup c, he can merely grasp the cord 34 and pull the handle 23 downwardly thereby swinging the closure plate 13 to its open position, that is the position shown in the dotted lines of FIGURE 1.

Rigidly secured to the exterior surface of the closure plate 13, slightly above the lower margin of the aperture 16 by means of sheet metal screws 35 is a U-shaped bracket 36 having relatively short arm portions 37 which extend forwardly of the closure plate 13. Welded or otherwise rigidly secured to the arm portions 37 of the bracket 36 is an upwardly and outwardly extending support ring 38 having legs 39 which are integrally connected by a bight 40. Welded to the bight 40 are a pair of clearing fingers 41 which are sized to extend through the aperture 27, and outwardly through the clearing aperture 9 substantially as shown in the dotted lines of FIGURE 1, when the closure plate 13 is swung to its open position. Thus, when the closure plate 13 is shifted to its open position, the clearing fingers 41 extend into the central passageway b and engage a cup c which may be lodged therein. The fingers 41, would, in effect, provide means for removing the container from the passageway b and outwardly through the clearing aperture 9 onto a conveyor plate 42, which is secured to a support structure (not shown) in any conventional manner. The closure plate 13 is limited in its movement by means of a retaining ring 42, which is welded to the undersurface of the support ring 38 and is designed to engage the exterior surface of the housing 1 in the manner as shown in the dotted lines of FIGURE 1 when the closure plate 13 is shifted to its open position. The closure plate 13 is normally biased to its closed position as shown in the solid lines of FIGURE 1 by means of a spring 43 which extends between an eyelet 44 formed within the handle 32 and a matching hook 45 secured to the upper end of the housing 1.

Figure 6:
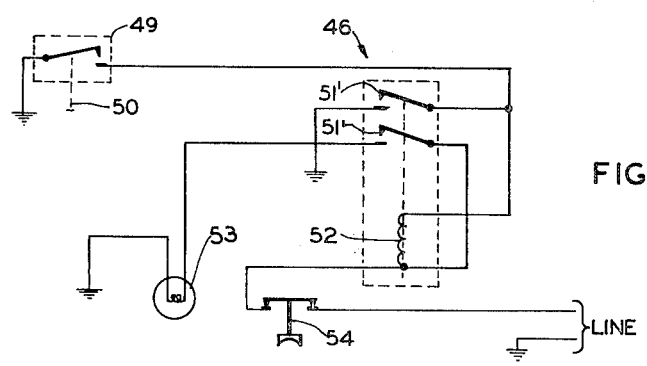
FIGURE 6 is a schematic illustration of the electrical circuitry forming part of the signaling mechanism of the cup stacking apparatus of FIGURE 1.

The cup stacking device A is provided with an electrically actuable signal mechanism 46 which is secured to a bracket 47, the latter in turn being secured to the upper hinge block 10 by means of screws 48. The signal mechanism 46 is designed to apprise a plant supervisor of a malfunction in the cup stacking apparatus A, particularly when there are a series of cups c which have become periodically lodged within a short interval of time. This signal mechanism 46 is particularly useful in that it is capable of automatically advising the supervisor, who may be in a position remote from the cup stacking apparatus A, of a specific malfunction. The signal mechanism 46 is schematically illustrated in FIGURE 6 and includes a normally open sensing switch 49 which is actuable by a plunger 50, the latter being engageable by the upper surface of the handle 32. The normally open sensing switch 49 is electrically connected to a relay contact 51 which is actuable with a normally open holding contact 51', and both of which are actuable by a solenoid 52. One of the contacts 31 is electrically interposed between a signal light 53 and a normally closed manually operable de-energizing switch 54, the latter in turn, being electrically connected to a suitable source of alternating electrical current (not shown). Thus, it can be seen that when the operator pulls on the flexible cord 34, in order to remove a lodged cup, in the manner as previously described, the switch 49 which is normally held in the open position by the plunger 50 will close since the plunger 50 is no longer engageable by the handle 32. As this occurs, a circuit is completed to the solenoid 52, which closes the holding contact 51' and the relay contact 51. Simultaneously therewith, a circuit is also completed to the signal light 53. In this connection, it should be understood that the signal light 53 can be replaced by any suitable signaling means such as a horn or bell. This signal will be maintained until the circuit is broken by pushing the manually operable pushbutton switch 54 at which time, the coil 52 will be de-energized thereby permitting the holding contact 51 to open. The opening of the contact 51 will, in turn, break the circuit to the light 53.

In use, the cup stacking apparatus A is connected in a cooperative manner to the discharge end of a molding machine of the type described in U.S. Patent No. 2,967,328. As the cups c are successively emitted from the molding machine, they are severed by a suitable cutting mechanism and passed into the feeding tube 2 leading to the cup stacking apparatus A.

As the cups c pass through the passageway b, the outer peripheral margin of the cup lip is engaged by the pivot pin 25. As the pivot pin 25 engages the cups c at a point which is offset from its central vertical axis, the cup c will pivot about a horizontal axis and rotate approximately 180° until its open end, which was initially pointed downwardly is pointed upwardly. During the rotation thereof, the closed end of the cup c will find a relief in the aperture 27 and the open end thereof will find a relief in the aperture 16 providing sufficient room in which to rotate through the 180° arc. When the cup c is completely reversed in its direction, it will pass through the lower end of the housing 1 into a suitable collecting apparatus 7.

It should be noted, that inasmuch as the pivot pin 25 is resiliently mounted, the pivot pin 25 will swing downwardly for a short distance with the cup c and thereby materially reduce the initial shock of contact. As a result of this reduction of initial shock, the chances for marring the peripheral margins of the open end of the cup c are materially reduced. Moreover, there is less chance for a cup c to strike the pin 25 and bounce upwardly causing the cup c to fall and become lodged on the pin 25. The amount of resiliency in the pivot pin 25, and hence the amount of movement of the pin 25 is conveniently adjusted by the pin 23 which serves as the torsion bar element.

In the event that a cup c becomes lodged within the passageway b, the operator will engage the flexible cord 34 and pull the handle 32 downwardly so that the closure plate 13 swings to its open position, that is the position as shown in the dotted lines of FIGURE 1. Normally when the cup c is lodged within the cup stacking device A the pivot pin 25 is partially inserted into the open end of the cup c. As the closure plate 13 is swung outwardly, the pivot pin 25 carried therewith is removed from its inserted position in the open end of the cup c. The guide fingers 41 will engage the cup c and provide a suitable means for ejecting the cup c from the central passageway b. Moreover, the fingers 41 form a lower grate thereby preventing the cup c from passing through the passageway b and eliminating the possibility of further lodging within the housing 1. After the lodged cup c has been removed from the housing 1, the operator releases the flexible cord 34 permitting the spring 43 to urge the closure plate 13 to its closed position, that is the position as shown in the solid lines of FIGURE 1.

When the closure plate 13 is shifted to its open position, the electrically actuable signal mechanism 46 will cause energization of the light 53, thereby apprising a plant supervisor of a malfunction of the cup stacking apparatus A. As the handle 32 is shifted downwardly, the normally open sensing switch 49 will close since it is no longer engaged by the handle 32. A circuit is thereby completed to the solenoid 52 closing the relay contact 51 and the holding contact 51'. By further reference to FIGURE 6, it can be seen that a circuit is thereby completed to the signal light 53 and moreover, this circuit will be maintained even upon opening of the switch 49.

The signal light 53 is turned off by pushing the manually operable pushbutton switch 54, thereby de-energizing the coil 52 and permitting the holding contact 51' to open.

It is possible to provide a modified form of cup stacking apparatus A' substantially as shown in FIGURES 7 and 8 and which is substantially similar to the previously described cup stacking apparatus A. The cup stacking apparatus A' is provided with an automatically actuable clearing mechanism which is adapted to clear the central passageway b upon automatically sensing the presence of a lodged cup c.

The cup stacking apparatus A' includes a source of light 55, which cooperates with a light sensitive transducer 56 substantially as shown in FIGURE 7. The source of light 55 is not directly opposed to the light sensitive transducer, but is offset therefrom. Moreover, the light sensitive transducer is so located that it is adapted to receive the light beam from the source of light 55 through the apertures 16, 27 in the housing 1. An automatic clearing mechanism 57 is suitably mounted on the bracket 47 and includes a solenoid 58 having a plunger 59. Pivotally mounted on the lower end of the plunger 59 is a link 60, which is also pivotally connected to the handle 32. Thus when the solenoid 58 is actuated, the plunger 59 will extend, thereby forcing the handle 32 downwardly. As the handle 32 is forced downwardly, the closure plate 13 will shift to its open position. In similar manner when the solenoid 58 is de-energized, the plunger 59 is retracted thereby permitting the closure plate 13 to shift to its closed position.

The electrical circuitry which operates the mechanism A' is more fully illustrated in FIGURE 8 and includes a coil 61 which is electrically connected to the light sensitive transducer 56 and which is adapted to operate a normally open switch 62. The switch 62 is electrically connected through a time delay mechanism 63 to a holding coil 64 which, in turn, operates a holding switch 65.

The cup stacking apparatus A' operates in a manner similar to the cup stacking apparatus A. However, the operator does not have to clear the apparatus A' by manually opening the closure plate 13. The light sensitive transducer 56 will sense the presence of each cup c passing through the central passageway b. As a cup c is passed between the transducer 56 and the source of light 55, the light circuit to the transducer 56 is broken. As the coil 61 is thereby de-energized, the normally open switch 62 will close. However, the coil 64 will not become energized for a pre-determined period of approximately two (2) seconds due to the interposition of the time delay element 63. Thus if a cup c should become lodged within the central passageway b, for a period of at least two seconds, the coil 64 will be energized, thereby closing the holding switch 65. As this occurs, a circuit is completed to the solenoid 58, thereby energizing the solenoid 58 and causing the outward shifting of the plunger 59. This, in turn, will cause the opening of the closure plate 13 in the manner previously described.

After the lodged cup c has been removed from the central passageway b, the light circuit between the transducer 56 and the source of light 55 is again completed, thereby de-energizing the coil 61. This will cause the switch 62 to open and thereby de-energize the coil 64 and the solenoid 58, permitting the closure plate 13 to shift to its closed position.

It should be understood that changes and modifications in the form, construction, arrangement and combination of parts may be made and substituted for those herein shown without departing from the nature and principle of my invention.

Having thus described my invention, what I desire to claim and secure by Letters Patent is:

1. A device for orienting open-ended containers and the like, said device comprising a direction reversing housing, means connected to said housing for feeding a plurality of direction oriented containers into said housing, a pin-like member extending into said housing and in the pathway of the containers, said pin-like member extending in a direction where it is adapted to engage the rim forming open end portion of said container and extend partially into said container and thereby flip the same to reverse its direction, and means for withdrawing each of said containers which are oriented in the opposite direction from said housing.

2. A device for orienting open-ended containers and the like, said device comprising a direction reversing housing, means connected to said housing for feeding a plurality of direction oriented containers into said housing, a pin-like member extending into said housing and in the pathway of the containers, said pin-like member extending in a direction where it is adapted to engage the rim forming open end portion of said container and extend partially into said container and thereby flip the same to reverse its direction, relief means formed within the side wall of said housing for permitting said container sufficient area in which to reverse its direction, and means for withdrawing each of said containers which are oriented in the opposite direction from said housing.

3. A device for orienting open-ended containers and the like, said device comprising a direction reversing housing, means connected to said housing for feeding a plurality of direction oriented containers into said housing, pivot means extending into said housing and being adapted to engage the open end portion of said container and flip the same to reverse its direction, means for withdrawing each of said containers which are oriented in the opposite direction from said housing, clearing means operatively associated with said housing for automatically removing any container which becomes lodged in the passageway in said housing during the direction reversing movement, and sensing means operatively associated with said clearing means and being adapted to actuate said clearing means upon sensing of a lodged container.

4. A device for orienting open-ended containers and the like, said device comprising a direction reversing housing, means connected to said housing for feeding a plurality of direction oriented containers into said housing, pivot means rockably mounted on said housing, said pivot means having a rockable element extending into said housing and being adapted to engage the open end portion of said container and flip the same to reverse its direction, and means for withdrawing each of said containers which are oriented in the opposite direction from said housing.

5. A device for orienting open-ended nestable containers and the like, said device comprising a direction reversing housing, means connected to said housing for feeding a plurality of direction oriented containers into said housing, pivot means extending into said housing at an angle which is displaced upwardly from the horizontal, means resiliently retaining said pivot means so that it is capable of shifting a short distance downwardly as the container passes through the housing, said pivot means being adapted to shift through an angle of 10 to 35° with respect to the horizontal, said pivot means being adapted to engage the open-end portion of said container and flip the same to reverse its direction, and means for withdrawing each of said containers which are oriented in the opposite direction from said housing.

6. A device for orienting open-ended containers and the like, said device comprising a direction reversing housing, means connected to said housing for feeding a plurality of direction oriented containers into said housing with the open ends thereof oriented in a generally downward direction, said housing having a passageway which is sized to accommodate said containers, said housing having a first elongated aperture formed within its side wall and being sized to permit the closed end of said container to extend therethrough during the direction reversing operation, said housing having a second elongated aperture formed within its side wall and which is sized to permit the open end of said container to extend therethrough during the direction reversing operation, a plate extending into said second elongated aperture, a pivot pin mounted within said plate and extending into said passageway, said pivot pin extending in a direction where it is adapted to engage the open end of said container and flip the same to reverse its direction, and means for withdrawing each of said containers which are oriented with the open end directed upwardly from said housing.

7. A device for orienting open-ended containers and the like, said device comprising a direction reversing housing, means connected to said housing for feeding a plurality of direction oriented containers into said housing with the open ends thereof oriented in a generally downwardly direction, said housing having a passageway which is sized to accommodate said containers, said housing having an elongated aperture formed within its side wall and being sized to permit the closed end of said container to extend therethrough during the direction reversing operation, a plate extending into said elongated aperture, a pivot pin rockably mounted within said plate and extending radially into said passageway and initially in a generally upward direction, said pivot pin being adapted to engage the open end of said container and flip the same to reverse its direction, and means for withdrawing each of said containers which are oriented with the open end directed upwardly from said housing.

8. A device for orienting open-ended containers and the like, said device comprising a direction reversing housing, means connected to said housing for feeding a plurality of direction oriented containers into said housing, said housing having a container removal aperture formed therein, a door hingedly mounted on said housing and being disposed in closurewise position over said aperture, said door being adapted to open from its closurewise position for removal of a container which is lodged within said housing, a supporting element operatively attached to said door and being movable therewith, a plurality of clearing fingers secured to said supporting element and being adapted to extend into said housing in a direction substantially diametrally opposite from said pivot means when said door is opened, said clearing fingers being engageable with a lodged container for removing such container from said housing when said door is opened and pivot means operatively associated with said housing and being adapted to engage the open end portion of a container and flip the same to reverse its direction.

9. A device for orienting open-ended containers and the like, said device comprising a direction reversing housing, means connected to said housing for feeding a plurality of direction oriented containers into said housing, said housing having a container removal aperture formed therein, a door hingedly mounted on said housing and being disposed in closurewise position over said aperture, said door being adapted to open from its closurewise position for removal of a container which is lodged within said housing, and a pivot pin operatively mounted on said door and being adapted to engage the open end portion of a container, extend partially therein and flip the container to reverse its direction, said pivot pin being disengageable from said container when said door is swung to its open position.

10. A device for orienting open-ended containers and the like, said device comprising a direction reversing housing, means connected to said housing for feeding a plurality of direction oriented containers into said housing, said housing having a container removal aperture formed therein, a door hingedly mounted on said housing and being disposed in closurewise position over said aperture, said door being adapted to open from its closurewise position for removal of a container which is lodged within said housing, guide means operatively associated with said door and being adapted to extend into said housing when said door is opened to guide the movement of the lodged container outwardly of said housing through said aperture, and pivot means operatively associated with said housing and being adapted to engage the open end portion of a container and flip the same to reverse its direction.

11. A device for orienting open-ended containers and the like, said device comprising a direction reversing a housing, means connected to said housing for feeding plurality of direction oriented containers into said housing, said housing having a container removal aperture formed therein, a door hingedly mounted on said housing and being disposed in closurewise position over said aperture, said door being adapted to open from its closurewise position for removal of a container which is lodged within said housing, light sensitive means operatively connected to said door and being adapted to sense the presence of a lodged container and causing said door to open upon sensing of a lodged container, and pivot means operatively mounted on said door and being adapted to engage the open end portion of a container and flip the same to reverse its direction.

12. A device for orienting open-ended containers and the like, said device comprising a direction reversing housing, means connected to said housing for feeding a plurality of direction oriented containers into said housing, said housing having a container removal aperture formed therein, a door hingedly mounted on said housing and being disposed in closurewise position over said aperture, said door being adapted to open from its closurewise position for removal of a container which is lodged within said housing, pivot means operatively associated with said housing and being adapted to engage the open end portion of a container and flip the same to reverse its direction, and advisory means remotely disposed from said housing and being operatively associated therewith for advising when said door was opened.

References Cited by the Examiner
UNITED STATES PATENTS

| 1,556,469 | 10/1925 | Alderman. | |
| 2,377,154 | 5/1945 | Hurley | 193—43 |
| 2,981,394 | 4/1961 | Stecher | 193—43 |

EVON C. BLUNK, *Primary Examiner.*
SAMUEL F. COLEMAN, *Examiner.*
A. LEVINE, *Assistant Examiner.*